Figure 3:
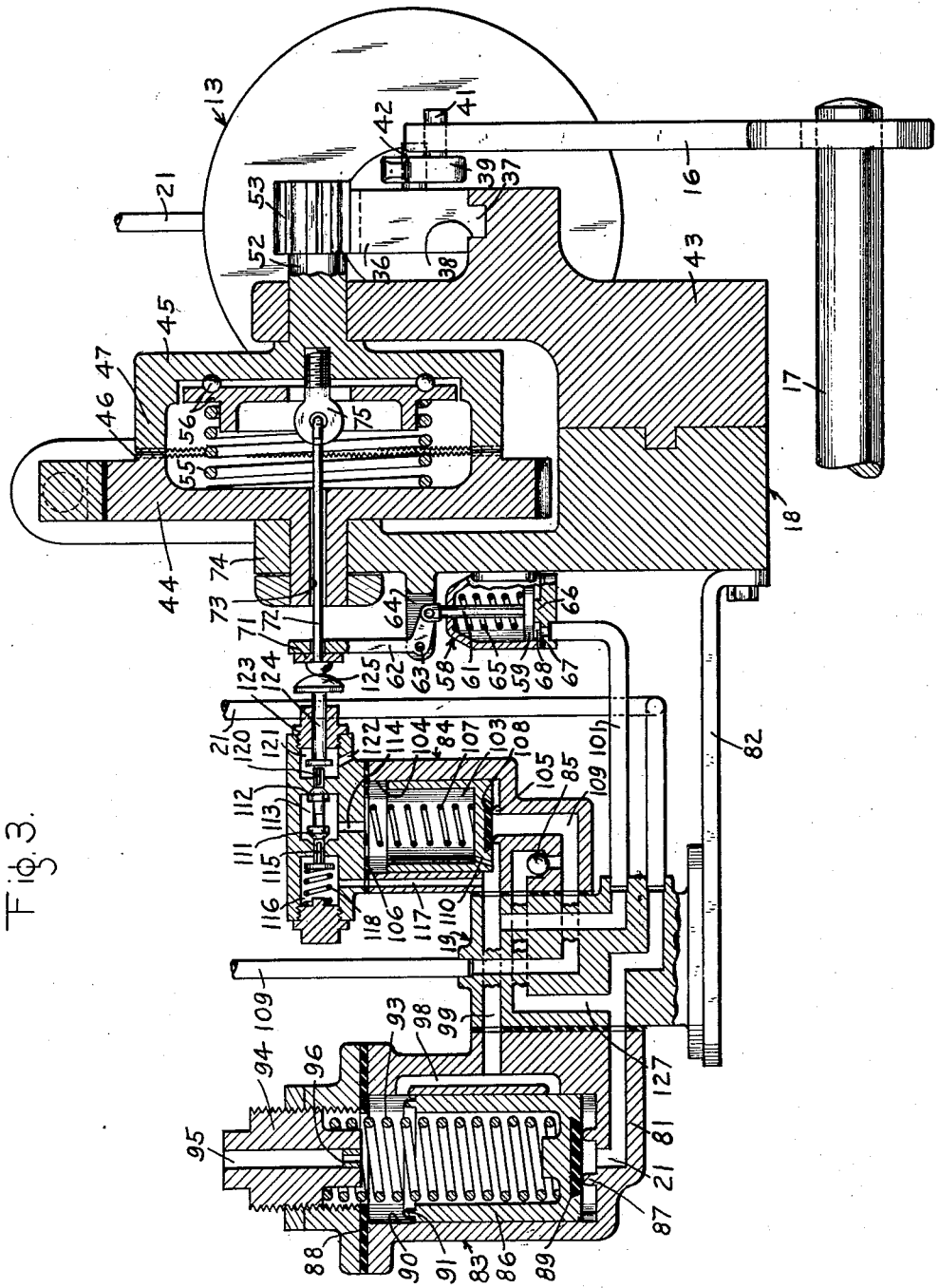

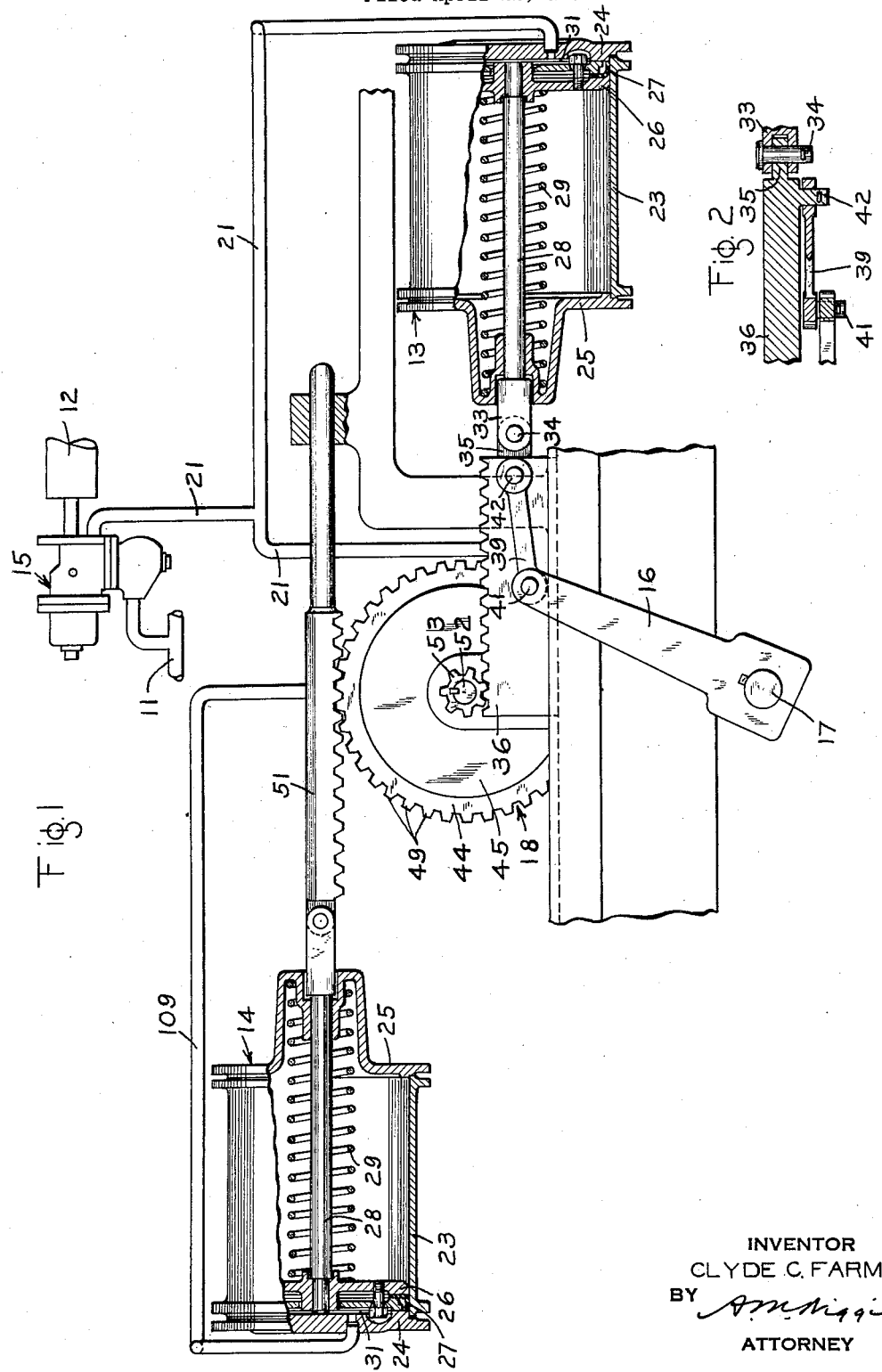

July 11, 1939.　　　　C. C. FARMER　　　　2,166,000
FLUID PRESSURE BRAKE
Filed April 22, 1938　　　　2 Sheets-Sheet 2

INVENTOR
CLYDE C. FARMER
BY
*A. M. Higgins*
ATTORNEY

Patented July 11, 1939

2,166,000

UNITED STATES PATENT OFFICE 2,166,000

FLUID PRESSURE BRAKE

Clyde C. Farmer, Pittsburgh, Pa., assignor to The Westinghouse Air Brake Company, Wilmerding, Pa., a corporation of Pennsylvania Application April 22, 1938, Serial No. 203,581

11 Claims. (Cl. 303—6)

This invention relates to fluid pressure brakes for vehicles such as railway cars and trains and particularly to fluid pressure brake equipment having a plurality of brake cylinders functioning cooperatively to effect application of the brakes.

On locomotives, particularly steam locomotives of the modern type, the construction of the locomotives and the mounting arrangement of the wheels thereon is such as to provide a limited space within which to dispose brake cylinders and brake rigging for operating the brake shoes associated with the locomotive wheels. In some cases, the space within which the brake cylinders for the locomotive may be disposed is so limited as to prevent the employment of brake cylinders of sufficient size to provide adequate braking for the locomotive with the conventional arrangement of brake rigging.

It is accordingly an object of my invention to provide a fluid pressure brake equipment adapted for use in applications such as above indicated and adapted to provide adequate braking power with brake cylinders small enough to fit in the limited space available therefor.

More specifically it is an object of my invention to provide a fluid pressure brake equipment including a novel arrangement for coordinating the operation of a slack take-up brake cylinder and a main brake cylinder.

The above objects, and other objects of my invention which will be made apparent hereinafter, are attained by means of an embodiment of my invention illustratively shown in the accompanying drawings, wherein:

Fig. 1 is a diagrammatic view showing the general arrangement of the parts in one embodiment of my invention, Fig. 2 is a fragmentary sectional view showing a detail of the construction shown in Fig. 1, and Fig. 3 is a fragmentary enlarged view, mainly in section, showing details of construction of parts not apparent in Fig. 1.

Description of equipment

Referring to Figs. 1 and 3, the equipment shown comprises a brake pipe 11, an auxiliary reservoir 12, a so-called slack take-up brake cylinder 13, a main brake cylinder 14, a distributing valve device 15 indicated for simplicity as the familiar triple valve, brake rigging including a brake lever 16 and brake rod 17 adapted to be actuated by the brake cylinders 13 and 14 to apply the brake shoes to the wheels of the locomotive or car, a clutch mechanism 18 and a control valve mechanism 19.

Considering the parts of the equipment in greater detail, the distributing valve device 15 is of well known construction and will therefore be described only as to function. When the brake pipe 11 is charged to the normal pressure carried therein under the control of the usual manually operated brake valve device, not shown, the distributing valve 15 is operative to charge the auxiliary reservoir 12 to the pressure carried in the brake pipe and a brake cylinder pipe 21 is connected to atmosphere to vent fluid under pressure from the two brake cylinders 13 and 14 as will be made more apparent hereinafter. Upon a reduction of the pressure in the brake pipe 11 by operation of the brake valve, not shown, the distributing valve device 15 is operative to close the exhaust communication for the brake cylinder pipe 21 and to establish communication through which fluid under pressure is supplied from the auxiliary reservoir to the pipe 21, the supply being cut off or lapped when the reduction in the auxiliary reservoir pressure corresponds substantially to the reduction in brake pipe pressure.

While illustrated as of the same size, the slack take-up brake cylinder 13 and the main brake cylinder 14 may be of different sizes, both as to the area of the piston contained therein and the stroke of the piston. The two brake cylinders are however similar in construction and, accordingly, only the main brake cylinder 14 will be described, it being understood that corresponding parts of the slack take-up brake cylinder 13 are designated by like reference numerals. As shown illustratively, the main brake cylinder 14 may comprise a cylindrical casing 23 of suitable diameter and length to be accommodated in the limited space which may be allowed therefor, a conventional pressure head 24 being provided at one end and a non-pressure head 25 at the opposite end of the casing 23 and suitably secured thereto by bolts or screws not shown. Contained in the cylindrical casing 23 is a piston 26 provided with a suitable sealing gasket or ring 27 and having a stem 28 which projects slidably through an opening in the non-pressure head 25 to the exterior of the brake cylinder. Interposed between the non-pressure head 25 and the brake cylinder piston 26 is a release spring 29 which serves to return the piston to the position shown when fluid under pressure is released from the piston chamber 31 formed between the piston 26 and the pressure head 24.

The outer end of the piston stem 28 of the slack take-up brake cylinder 13 is formed as a clevis 33 and is connected as by a pin 34 to a projecting lug 35 formed at the end of a gear rack member 36. The gear rack member 36 has a rib 37 formed on the edge opposite the teeth thereof which slides in a corresponding groove 38 formed in the casing of the clutch mechanism 18.

The brake operating lever 16 is connected to the gear rack member 36 by a link 39, the link 39 being pivotally connected at one end to the outer end of the lever 16 as by a pin 41 and at the opposite end to the gear rack member 36 as by a projecting pin or lug 42 formed on the gear rack member 36. Accordingly when fluid under pressure is supplied to the piston chamber 31 of the slack take-up brake cylinder 13 the piston 26 is shifted in the left-hand direction, as seen in Fig. 1, and the brake operating lever 16 is correspondingly rotated in a counterclockwise direction to move the brake shoes into contact with the rim of the car wheels.

The main brake cylinder 14 is adapted to also effect rotation of the brake operating lever 16 in a counterclockwise direction to effect application of the brakes through the medium of the clutch mechanism 18. The clutch mechanism 18 comprises a supporting casing 43 suitably mounted on the chassis or body of the locomotive or car and two rotary clutch members 44 and 45 suitably journaled in co-axial relation in the casing 43. The clutch member 44 is provided with an annular saw-tooth surface 46 on one face thereof and the member 45 is provided with a corresponding annular portion 47 having a saw-tooth surface for cooperating with the saw-tooth surface on the member 44 in interlocking relation to cause the two members to rotate together.

The clutch element 44 has gear teeth 49 formed at the outer rim thereof which mesh cooperatively with a gear rack 51 that is secured at one end to the outer end of the piston stem 28 of the main brake cylinder 14 and is slidably supported at the opposite end in a bracket 52 of the casing 43. The clutch element 45 has a shaft or stem 52 on which is fixed a suitable pinion 53 that meshes with the teeth on the gear rack member 36.

It will accordingly be seen that with the clutch members 44 and 45 in engagement, the shifting of the main brake cylinder piston 26 in the right-hand direction, as seen in Fig. 1, in response to the supply of fluid under pressure to the piston chamber 31 causes a rotation of the pinion 53 in a clockwise direction which results in movement of the gear rack member 36 in the left-hand direction and the consequent operation of the brake operating lever 16 to apply braking force to the brake shoes engaging the car wheels.

The gear ratio between the clutch element 44 and the pinion 53 may be made any desired value so as to secure a desired amplification of power in transmitting the fluid pressure force from the main brake cylinder 14 to the brake operating lever 16.

The clutch members 44 and 45 of clutch mechanism 18 are normally disengaged by a coil spring 55 interposed therebetween. A suitable ball-bearing race 56 is interposed between the end of the spring 55 and the clutch member 45 to minimize the friction between the spring 55 and the clutch member 45 when the clutch member 45 is rotarily shifted while the clutch member 44 remains stationary.

The clutch members 44 and 45 are shifted into clutching engagement against the yielding resistance of spring 55 by a fluid pressure operated cylinder 58 that is suitably attached to the casing 43 of the clutch mechanism 18. The cylinder 58 contains a piston 59 having a stem 61 pivotally connected at the outer end thereof to one arm of a bell-crank lever 62 which is pivoted at the fulcrum thereof, as by a pin 63, on a projecting lug 64 formed on the casing 43. A coil spring 65 interposed between the piston 59 and the non-pressure end of the cylinder 58 normally urges the piston 59 downwardly into engagement with a projecting lug 66 formed on the inner face of the pressure head 67 of the cylinder 58. When fluid under pressure is supplied to the piston chamber 68 formed between the piston 59 and the pressure head 67, the piston 59 is urged upwardly to rock the bell-crank lever 62 in a counterclockwise direction. The second arm of the bell-crank lever 62 bears against a flange or collar 71 fixed on one end of a rod 72 which extends slidably through a longitudinal bore 73 in the shaft 74 of the clutch member 44 and which is secured at the opposite end thereof to the clutch member 45 as by an eyelet stud 75.

Accordingly, when the bell-crank lever 62 is rocked in a counterclockwise direction, it exerts an outward pull on the rod 72 which pulls the clutch member 45 into engagement with the clutch member 44 against the yielding force of the spring 55 so that the two clutch members 44 and 45 thereafter rotarily move in unison.

The control valve mechanism 19 comprises a casing 81 which is suitably mounted, as on a bracket 82 attached to the casing 43 of the clutch mechanism 18, and which embodies therein a clutch cylinder control valve 83, a main brake cylinder control valve 84, and a ball check valve 85.

The clutch cylinder valve device 83 comprises a valve piston 86 which operates in a suitable bore 90 in the casing and which is shiftable in opposite directions into seated engagement with an annular rib seat 87 at one end of the bore and an annular gasket seat 88 disposed at the opposite end. In the face of the valve piston 86 is a suitable gasket 89 which engages the annular rib seat 87. The skirt of the valve piston has formed on the end thereof an annular rib 91 which seats on the gasket seat 88.

A coil spring, interposed between the valve piston 86 and a screw plug 94 secured in the casing at outer end of the bore 90 in which the valve piston operates, yieldingly urges the valve piston into seated relation on the annular rib seat 87. The screw plug 94 has an exhaust passage 95 therein containing a choke 96 for maintaining the back side of the valve piston 86 at atmospheric pressure.

The brake cylinder pipe 21 has a branch thereof connected to a passage 21 in the casing which opens at the inner seated area of the valve piston 86 when seated on the annular rib seat 87. The spring 93 is of such strength as to maintain the valve piston 86 seated on the annular rib seat 87 until the pressure of the fluid supplied through the brake cylinder pipe and passage 21 increases substantially to the value at which the brake shoes engage the rim of the car wheels in response to movement by the slack take-up brake cylinder 13. When the pressure of the fluid supplied into the brake cylinder pipe and passage 21 is sufficient to unseat the valve piston 86 it is unseated from the annular rib seat 87 and the sudden increase in the area of the face of the valve piston subject to the pressure of the fluid supplied through pipe and passage 21 results in a sudden increase of force which snaps the valve piston 86 suddenly upwardly into seated engagement on the gasket seat 88.

With the valve piston 86 seated on the gasket seat 88 the upper and lower ports of a passage 98 which open into the bore 90 adjacent the gasket seat 88 and the annular rib seat 87, respectively, are respectively lapped and uncovered. Fluid under pressure then flows from the passage 21 into the passage 98 and a branch passage 99 thereof leading to the main brake cylinder control valve 84. A branch pipe and passage 101 of pipe 99 leads to the piston chamber 68 of the clutch operating cylinder 58.

The main brake cylinder control valve device 84 comprises a valve piston 103 which operates in a suitable bore 104 in the casing and is shiftable in one direction into seated relation on an annular rib seat 105 formed at one end of the bore 104 and in the opposite direction into seated relation on a gasket seat 106. The valve piston 103 has a gasket seal 108 in the face thereof which engages the annular rib seat 105 and the end of the skirt of the valve piston is rounded to engage the gasket seat 106. A coil spring 107 effective on the back of the valve piston 103 normally yieldingly urges the valve piston into seated relation on the annular rib seat 105.

A pipe and passage 109 connect the piston chamber 31 of the main brake cylinder 14 to the inner seated area of the valve piston 103 when seated on the annular rib seat 105 and the passage 99 opens into the space at the outer seated area of the valve piston 103 when seated on the annular rib seat 105. The valve piston 103 thus controls communication between the passage 99 and the pipe and passage 109 leading to the piston chamber of the main brake cylinder 14. The pressures on opposite sides of the valve piston 103 are equalized through a restricted port 110 in the valve piston so that the spring 107 maintains the valve piston seated on the annular rib seat 105.

Operation of the main brake cylinder control valve device 84 is controlled by means of a pair of oppositely seating pilot valves 111 and 112 which are arranged to be operatively shifted upon operation of the clutch operating cylinder 58 to effect engagement of the clutch members 44 and 45 of the clutch mechanism 18.

As shown in Fig. 3, the pilot valves 111 and 112 are contained in a chamber 113 in the casing 81, which chamber is constantly open through a port 114 to the chamber formed at the back of the valve piston 103. The pilot valve 111 has a fluted stem 115 which is slidably supported in a suitable bore that connects the chamber 113 to a chamber 116, the chamber 116 being connected through a passage 117 to the passage 99. A coil spring 118, contained in the chamber 116, acts on the end of the fluted stem 115 of the pilot valve 111 to urge the valves 111 and 112 into unseated and seated positions. With the pilot valve 111 unseated, the chamber at the back of the valve piston 103 and the passage 99 are connected independently of the port 110 in the valve piston so that the pressures on opposite sides of the valve piston are equalized.

The pilot valve 112 has a fluted stem 120 which extends slidably through a bore in the casing into a chamber 121 that is constantly open to atmosphere through a port 122. Slidably operable in a suitable bore in a screw plug 123 closing the open end of the chamber 121 is an operating rod or stem 124 that engages the end of the valve stem 120 within chamber 121 and is provided on the outer end thereof with a button 125 adapted to be engaged by the outer end of the clutch actuating rod 72.

As long as fluid under pressure is released from the piston chamber 68 of the clutch operating cylinder 58 and the bell-crank lever 62 is rocked to the position shown, the spring 118 maintains the pilot valves 111 and 112 in unseated and seated positions. When fluid under pressure is supplied to the piston chamber 68 of the clutch operating cylinder 58 and the clutch operating rod 72 is shifted in the left-hand direction to effect engagement of the clutch members 44 and 45, the operating stem 124 is shifted in the left-hand direction to shift the pilot valves 111 and 112 into seated and unseated positions, respectively. With the pilot valve 111 seated, the supply of fluid under pressure to the back of the valve piston 103 is cut off except through the restricted port 110; and with the pilot valve 112 unseated, the chamber at the back of the valve piston 103 is vented rapidly to atmosphere through the exhaust port 122. As a result of the differential of fluid pressure forces thereby created on the valve piston 103, it is accordingly shifted upwardly and unseated from the annular rib seat 105. When the valve piston 103 is unseated, the inner seated area thereof is added to the outer seated area thereof and, consequently, the fluid pressure in the passage 99 acts suddenly over an increased area and the valve piston 103 is therefore snapped upwardly into seated engagement on the gasket seat 106 to open wide the communication between the passage 99 and the pipe and passage 109 leading to the piston chamber 31 of the main brake cylinder 14.

The ball check valve 85 is contained in a branch passage 127 which connects the brake cylinder passage 21 and the passage 109 leading to the main brake cylinder 14 and is disposed in such cooperating relation with a valve seat formed in the passage as to prevent the supply of fluid under pressure therepast from the passage 21 to the passage 109. Accordingly, fluid under pressure cannot be supplied to the piston chamber of the main brake cylinder 14 except past the control valve device 84. When fluid under pressure is released from the brake cylinder pipe and passage 21, the ball check valve 85 unseats to permit the release of fluid under pressure from the piston chamber of the main brake cylinder 14 independently of the control valve device 84.

*Operation of equipment*

Assuming that the brake pipe 11 and auxiliary reservoir 12 are charged to the normal pressure carried therein and the distributing valve device 15 correspondingly conditioned to effect release of the brakes while the train is traveling along the track, and that a service application of the brakes is desired, the operator effects a service reduction of the pressure in the brake pipe by means of the brake valve, not shown. The distributing valve device 15 accordingly operates in response to the service reduction of brake pipe pressure to supply fluid under pressure from the auxiliary reservoir 12 to the brake cylinder pipe 21 and accordingly through the two branches of the pipe to the piston chamber 31 of the slack take-up brake cylinder 13 and to the control valve mechanism 19, respectively.

The elements 44 and 45 of the clutch mechanism 18 are normally disengaged because fluid under pressure is vented from the piston chamber 68 of the clutch operating cylinder 58 to atmosphere by way of pipe and passage 101, passage 99, the upper one of the ports of the passage 98, bore 90, choke 96 and passage 95. Accordingly, when fluid under pressure is supplied to the piston chamber 31 of the slack take-up brake cylinder 13, the rack element 36 is shifted in the left-hand direction and the brake operating lever 16 is correspondingly shifted in a counterclockwise direction to move the brake shoes into contact with the rim of the car wheels thereby completely taking up the slack in the brake rigging.

Due to the fact that the clutch elements 44 and 45 are disengaged, the shifting of the rack element 36 produces rotation of the clutch element 45 only.

Substantially at the time that the brake shoes engage the rim of the car wheels, the valve piston 86 of the clutch cylinder control valve device 83 is unseated by the pressure of the fluid supplied through the branch passage of the brake cylinder pipe 21 and accordingly fluid under pressure is supplied from the brake cylinder pipe 21 through the lower port of the passage 98, passage 99 and pipe and passage 101 to the piston chamber 68 of the clutch operating cylinder 58 which is accordingly operated to effect engagement of the clutch elements 44 and 45 in the manner previously described and thus also operation of the pilot valves 111 and 112 to effect unseating of the valve piston 103 of the main brake cylinder control valve device 84. Accordingly, the pressures in the two brake cylinders 13 and 14 are rapidly equalized and thereafter build up in unison to a degree dependent upon the amount of pressure established in the brake cylinder pipe 21, which is in turn determined by the amount of the reduction in brake pipe pressure.

With the clutch elements 44 and 45 in engagement, it will be seen that the fluid pressure forces exerted on the piston 26 of the slack take-up brake cylinder 13 and the piston 26 of main brake cylinder 14 are both effective to shift the gear rack element 36 in the left-hand direction to press the brake shoes to the rim of the car wheels and thus apply the brakes.

Due to the gear ratio between the pinion 53 and the clutch element 44, the force exerted on the piston 26 of the main brake cylinder 14 is amplified in a corresponding ratio. Obviously, once the brake shoes engage the rim of the car wheels, further movement of the brake operating lever 16 with increase of brake applying forces is relatively small and, therefore, the travel of the piston 26 of the main brake cylinder 14 is relatively short. Accordingly, due to the amplification of braking power through the clutch element 44 and pinion 53 and the fact that a relatively short piston travel is required, the main brake cylinder 14 may be of relatively small diameter and length to produce relatively high braking forces. The slack take-up cylinder 13 is ordinarily relatively small compared to the main brake cylinder 14 and thus it will be seen that the brake cylinders 13 and 14 may be accommodated in a limited space without sacrificing braking power.

It will be seen that as long as the clutch elements 44 and 45 remain engaged, the valve piston 103 of the main brake cylinder control valve device 84 remains unseated from the annular rib seat 105 to maintain equalization between the pressures in the slack take-up brake cylinder 13 and the main brake cylinder 14 because the restricted port 110 in the face of the valve piston 103 permits leakage of fluid under pressure from the passage 99 to the chamber at the back of valve piston 103 at a relatively slower rate than fluid is exhausted through the port 122 from the chamber at the back of the valve piston 103.

Obviously, the operator may vary the amount of reduction of brake pipe pressure to vary the degree of the service application or to increase the degree of the application in steps, as desired, in the conventional manner.

When it is desired to effect release of the brakes, the operator restores the pressure in the brake pipe in a series of successive steps or in one step as desired. The distributing valve device 15 accordingly operates in response to the increase in brake pipe pressure to reduce the pressure of the fluid in the two brake cylinders 13 and 14 correspondingly. It will be observed that fluid under pressure is released from the main brake cylinder 14 through the pipe and passage 109 and past the unseated ball check valve 85 and through passage 127 to the brake cylinder passage and pipe 21, independently of the valve piston 103. While the valve piston 103 is unseated, fluid under pressure is also released from the main brake cylinder 14 past the unseated valve piston 103 and through passage 99 and the lower branch port of the passage 98 to the brake cylinder passage and pipe 21.

When the pressure in the two brake cylinders 13 and 14 is reduced to the point where the brake shoes are about to disengage the rim of the car wheels, the valve piston 86 of the clutch control valve device 83 is reseated on the annular rib seat 87, thus cutting off the communication through which fluid under pressure may be released from the main brake cylinder past the valve piston 103. Thus, the further and complete release of fluid under pressure from the main brake cylinder 14 is thereafter effected past the ball check valve 85.

Upon the reseating of the valve piston 86 on the rib seat 87, the release communication previously described is established through which fluid under pressure is exhausted from the piston chamber 86 of the operating cylinder 58 and accordingly the clutch elements 44 and 45 are returned to disengaged position and the pilot valves 111 and 112 restored to the position shown in Fig. 3 to cause reseating of the valve piston 103 on the annular rib seat 105.

Upon the restoration of the normal pressure in the brake pipe 11, the distributing valve device 15 is conditioned to completely exhaust fluid under pressure from the brake cylinders 13 and 14 and the brakes are thereby completely released.

Obviously, an emergency application of the brakes may be effected in the usual manner by effecting a reduction of pressure in the brake pipe 11 at an emergency rate, the slack take-up brake cylinder 13 and the main brake cylinder 14 functioning in sequence in exactly the same manner as described above for a service application.

*Summary*

Summarizing, it will be seen that I have provided a fluid pressure brake equipment which enables relatively small brake cylinders to be employed so that the cylinders may be accommodated in a relatively limited space without in any manner sacrificing braking power.

The equipment comprises essentially a slack take-up brake cylinder and a main brake cylinder, the main brake cylinder being cut in automatically at substantially the time that the brake shoes contact the rim of the wheels through a clutch device which inherently provides power amplification.

While I have disclosed only one embodiment of my invention, it will be apparent that various omissions, additions, or modifications may be made in the embodiment shown without departing from the spirit of my invention. It is accordingly not my intention to limit the scope of my invention except as it is necessitated by the scope of the prior art.

Having now described my invention, what I claim as new and desire to secure by Letters Patent, is:

1. A fluid pressure brake equipment comprising a brake operating lever, two brake cylinders, one of said brake cylinders being effective at all times to operate said brake lever, clutch means interposed between the other of said brake cylinders and the said brake lever and normally conditioned to render said other brake cylinder ineffective to operate the brake lever, fluid pressure responsive means for effecting operation of the clutch means to render the said other brake cylinder effective to operate the brake lever, and means controlled according to the pressure in the said one brake cylinder for controlling the operating fluid pressure for the fluid pressure responsive means and also for controlling the supply of fluid under pressure to the said other brake cylinder.

2. A fluid pressure brake equipment comprising a brake operating lever, two brake cylinders, a clutch mechanism so constructed and arranged that when in disengaged condition only one of said brake cylinders is effective to operate the brake lever and when in engaged condition both of said brake cylinders are effective to operate said brake lever, fluid pressure responsive means for effecting operation of the clutch means to engaged condition, and means controlled by the pressure in the said one brake cylinder for causing the supply of fluid under pressure to the fluid pressure responsive means and to the other of said brake cylinders only when the pressure in the said one brake cylinder exceeds a certain pressure.

3. A fluid pressure brake equipment comprising a brake operating lever, two brake cylinders, a clutch mechanism so constructed and arranged that when it is in disengaged condition only one of said brake cylinders is effective to move the brake operating lever and when it is in engaged condition both of said brake cylinders are effective to move the brake lever, fluid pressure responsive means effective upon an increase in pressure acting thereon to effect operation of the clutch mechanism to engaged condition and upon the release of fluid under pressure therefrom to effect operation of the clutch mechanism to disengaged condition, means effective when the pressure of fluid supplied to the said one brake cylinder exceeds a certain pressure for effecting an increase in pressure on the fluid pressure responsive means, and valve means operated in response to the operation of the clutch mechanism to engaged position for establishing communication through which fluid under pressure is supplied to the other of said brake cylinders.

4. A fluid pressure brake equipment comprising a brake operating lever, two brake cylinders, a clutch mechanism so constructed and arranged that when it is in disengaged condition only one of said brake cylinders is effective to move the brake operating lever and when it is in engaged condition both of said brake cylinders are effective to move the brake lever, fluid pressure responsive means effective upon an increase in pressure acting thereon to effect operation of the clutch mechanism to engaged condition and upon the the release of fluid under pressure therefrom to effect operation of the clutch mechanism to disengaged condition, means effective when the pressure of fluid supplied to the said one brake cylinder exceeds a certain pressure for effecting an increase in pressure on the fluid pressure responsive means, valve means operated in response to the operation of the clutch mechanism to engaged position for establishing communication through which fluid under pressure is supplied to the other of said brake cylinders, and a one-way valve effective to prevent the supply of fluid under pressure therepast to the other of said brake cylinders and adapted to permit the release of fluid under pressure from said other brake cylinder therepast independently of said valve means.

5. A fluid pressure brake equipment comprising a brake operating lever, a first brake cylinder containing a piston having a stem constantly effective to move said brake lever in response to variations of pressure in the said first brake cylinder, a first gear rack element effective, when moved, to correspondingly move the said brake lever, a second brake cylinder containing a piston having a stem, a second gear rack element adapted to be moved in response to movement of the piston stem of said second brake cylinder, and a gear mechanism connecting the first and second gear rack elements.

6. A fluid pressure brake equipment comprising a brake operating lever, a first brake cylinder containing a piston having a stem constantly effective to move said brake lever in response to variations of pressure in the said first brake cylinder, a first gear rack element effective, when moved, to correspondingly move the said brake lever, a second brake cylinder containing a piston having a stem, a second gear rack element adapted to be moved in response to movement of the piston stem of said second brake cylinder, and a gear mechanism connecting said second gear rack element to said first gear rack element and so constructed and arranged as to amplify the force applied by the said second brake cylinder to move the said brake operating lever.

7. A fluid pressure brake equipment comprising a brake operating lever, a first brake cylinder containing a piston having a stem constantly effective to move said brake lever in response to variations of pressure in the said first brake cylinder, a first gear rack element effective, when moved, to correspondingly move the said brake lever, a second brake cylinder containing a piston having a stem, a second gear rack element adapted to be moved in response to movement of the piston stem of said second brake cylinder, a first gear wheel meshing with said first gear rack element, a second gear wheel cooperatively meshing with said second gear rack element, and a clutch mechanism controlling the connection between the said two gear wheels whereby to render said second brake cylinder effective or non-effective to apply force to move said brake operating lever.

8. A fluid pressure brake equipment comprising a brake operating lever, a first brake cylinder containing a piston having a stem constantly effective to move said brake lever in response to variations of pressure in the said first brake cylinder, a first gear rack element effective, when moved, to correspondingly move the said brake lever, a second brake cylinder containing a piston having a stem, a second gear rack element adapted to be moved in response to movement of the piston stem of said second brake cylinder, a first gear wheel meshing with said first gear rack element, a second gear wheel cooperatively meshing with said second gear rack element, a clutch mechanism controlling the connection between the said two gear wheels whereby to render said second brake cylinder effective or non-effective to apply force to move said brake operating lever, and means controlled according to the pressure in said first brake cylinder for controlling the operation of the clutch mechanism.

9. A fluid pressure brake equipment comprising a brake operating lever, a first brake cylinder containing a piston having a stem constantly effective to move said brake lever in response to variations of pressure in the said first brake cylinder, a first gear rack element effective, when moved, to correspondingly move the said brake lever, a second brake cylinder containing a piston having a stem, a second gear rack element adapted to be moved in response to movement of the piston stem of said second brake cylinder, a first gear wheel meshing with said first gear rack element, a second gear wheel cooperatively meshing with said second gear rack element, a clutch mechanism controlling the connection between the said two gear wheels whereby to render said second brake cylinder effective or non-effective to apply force to move said brake operating lever, and means controlled by the pressure in the said first brake cylinder for controlling the operation of the clutch mechanism and the supply of fluid under pressure to the said second brake cylinder.

10. A fluid pressure brake equipment comprising a brake operating lever, a first brake cylinder containing a piston having a stem constantly effective to move said brake lever in response to variations of pressure in the said first brake cylinder, a first gear rack element effective, when moved, to correspondingly move the said brake lever, a second brake cylinder containing a piston having a stem, a second gear rack element adapted to be moved in response to movement of the piston stem of said second brake cylinder, a first gear wheel meshing with said first gear rack element, a second gear wheel cooperatively meshing with said second gear rack element, a clutch mechanism controlling the connection between the said two gear wheels whereby to render said second brake cylinder effective or non-effective to apply force to move said brake operating lever, and means controlled by the pressure in the said first brake cylinder and effective to cause operation of the clutch mechanism to connect the said two gear wheels only when the pressure in the said first brake cylinder exceeds a certain pressure.

11. A fluid pressure brake equipment comprising a brake operating lever, a first brake cylinder containing a piston having a stem constantly effective to move said brake lever in response to variations of pressure in the said first brake cylinder, a first gear rack element effective, when moved, to correspondingly move the said brake lever, a second brake cylinder containing a piston having a stem, a second gear rack element adapted to be moved in response to movement of the piston stem of said second brake cylinder, a first gear wheel meshing with said first gear rack element, a second gear wheel cooperatively meshing with said second gear rack element, a clutch mechanism controlling the connection between the said two gear wheels whereby to render said second brake cylinder effective or non-effective to apply force to move said brake operating lever, and means effective as long as the pressure of fluid in the said first brake cylinder does not exceed a certain pressure for causing said clutch mechanism to disconnect said two gear wheels and also to prevent the supply of fluid under pressure to the said second brake cylinder and effective when the pressure of the fluid in the said first brake cylinder exceeds said certain pressure for effecting operation of the clutch mechanism to connect the said two gear wheels and also to effect the supply of fluid under pressure to the said second brake cylinder.

CLYDE C. FARMER.